United States Patent [19]

Saleh et al.

[11] Patent Number: 5,169,824
[45] Date of Patent: Dec. 8, 1992

[54] CATALYST COMPRISING AMORPHOUS NIO ON SILICA/ALUMINA SUPPORT

[75] Inventors: Ramzi Y. Saleh, Flemington; Stuart L. Soled, Pittstown; Nicholas C. Dispenziere, Wall, all of N.J.

[73] Assignee: Exxon Chemical Patents Inc., Linden, N.J.

[21] Appl. No.: 644,998

[22] Filed: Jan. 22, 1991

[51] Int. Cl.⁵ .......................... B01J 21/12; B01J 23/82
[52] U.S. Cl. .................................. 502/259; 502/263
[58] Field of Search ................................ 502/259, 263

[56] References Cited

U.S. PATENT DOCUMENTS

| | | | |
|---|---|---|---|
| 2,452,198 | 10/1948 | Kennedy et al. | 502/259 |
| 2,581,228 | 1/1952 | Bailey et al. | 502/259 |
| 3,557,242 | 1/1971 | Sampson et al. | 260/683.15 |
| 3,649,710 | 3/1972 | Neal et al. | 260/683.15 |
| 3,658,935 | 4/1972 | Pine | 260/683.15 |
| 3,673,115 | 6/1972 | Linsen et al. | 502/259 |

FOREIGN PATENT DOCUMENTS

| | | | |
|---|---|---|---|
| 1069296 | 5/1967 | United Kingdom . | |
| 1215943 | 12/1970 | United Kingdom . | |
| 2200302 | 8/1988 | United Kingdom | 502/259 |

Primary Examiner—Carl F. Dees

[57] ABSTRACT

The present invention provides for a catalyst composition which is effective for use in the production of dimer products and higher olefin products from lower olefins such as propylene and butene in high yields and with an average degree of branching in the dimer products of less than about 1.6 methyl groups per molecule, generally in the range of from about 1.0 to 1.4 methyl groups per molecule. The present invention also provides a process for producing such dimer and higher olefin products using the catalyst composition of this invention. The catalyst of the invention comprises an amorphous nickel oxide (NiO) present as a disperse substantial monolayer on the surfaces of a silica ($SiO_2$) support, which support also contains minor amounts of an oxide of aluminum, gallium or indium such that the ratio of NiO to metal oxide present in the catalyst is within the range of from about 4:1 to about 100:1. The catalyst may be prepared by precipitating a water insoluble nickel salt onto the surfaces of a silica support which has been impregnated with the metal oxide or onto a silica-alumina support which has been dealuminized such that the resulting nickel oxide/alumina ratio will fall within the ranges set forth above. The catalyst may then be activated by calcination in the presence of oxygen at a temperature within the range of from about 500° to 700° C.

15 Claims, No Drawings

CATALYST COMPRISING AMORPHOUS NIO ON SILICA/ALUMINA SUPPORT

FIELD OF THE INVENTION

The present invention relates to catalyst materials useful for the oligomerization of $C_3$ and $C_4$ olefins which catalysts comprise amorphous NiO present as a substantial monolayer on the surfaces of a silica support, and which catalyst further contains minor quantities of a trivalent metal oxide selected from the group consisting of aluminum oxide, gallium oxide and indium oxide.

DESCRIPTION OF RELATED ART

The conversion of $C_3$ or $C_4$ olefins into dimers and hydrocarbons of higher molecular weight using catalysts comprising nickel supported on silica or silica/alumina supports is known in the art. Dimers such as hexenes and octenes so produced are particularly useful for conversion by the well known oxo alcohol process into the corresponding heptyl and nonyl alcohols which may be used in the production of plasticizers, lubricating oil additives, detergents, defoamers and similar products.

Octene dimers are particularly useful in the manufacture of plasticizer alcohols. These dimers generally comprise a mixture of octene isomers having a varying degree of side chain methyl substitution per molecule present in the mixture.

N-octenes, for example, contain no side chain methyl groups, methyl-heptenes contain 1 side chain methyl group; dimethylhexenes contain 2 side chain methl groups; and trimethylpentenes contain 3 side chain methyl groups. A mixture of isomeric octenes having an average of less than about 1.6 side chain methyl groups per molecule is especially suitable for conversion into nonyl alcohols and gives rise to higher oxonation yields and better quality plasticizer alcohols.

It is known to dimerize olefins by contact with a nickel oxide catalyst at elevated temperature. For example, U.S. Pat. No. 3,649,710 describes a process in which butene and propylene are first pre-treated and then co-dimerized by passing over a nickel oxide catalyst. The reference teaches that the pre-treatment of the olefin substantially improves the life of the catalyst. U.S. Pat. No. 3,658,935 discloses a process for preparing propylene and n-butene dimers by contacting the feed under reaction conditions with a catalyst comprising a silica alumina gel containing 10 to 45% alumina and 0.1 to 35% nickel. In addition, U.S. Pat. No. 3,557,242 discloses a process for copolymerizing isobutene and a lower olefin using a catalyst comprising jointly coprecipitated nickel, silicon and aluminum oxide species wherein the catalyst contains from 2 to 12 wt. % nickel, 0.4 to 5 wt. % aluminum, 0.05 to 0.8 wt. % alkali metal and up to 5 wt. % coprecipitated magnesium oxide.

British Specification No. 1069296 discloses the production of dimers from olefins such as butene by contact with a catalyst containing aluminum and nickel ions on a silica support at temperatures up to 400° C. British Specification No. 1215943 discloses the dimerizing of olefins including butenes by contact with the same kind of catalyst which is activated in a slightly different manner. The catalyst used in these specifications differs from those used in the U.S. patents referred to above primarily by including only a small proportion of nickel in the catalyst composition, generally less than 10% by weight based on the weight of silica gel.

In addition, U.S. Pat. No. 2,581,228 discloses a catalyst useful for polymerizing olefins which comprises a silica gel impregnated with a nickel salt and an aluminum salt such that the activated catalyst contains from about 0.1 to 35 wt. % nickel in the form of nickel oxide and from about 1 to 10 wt. % alumina based on the weight of silica gel.

Such known catalysts and methods for dimerizing lower olefins such as butene into higher olefins such as octene suffer from one or more disadvantages. The percent conversion of olefin to dimer and higher products may be low and the conversion per pass over the catalyst used to form the more valuable dimer products such as octenes is too low, generally less than 50%. While the yield of octenes may be increased using dimerization process conditions including relatively low space velocity (longer catalyst contact time) and higher temperatures, it is found that the octenes produced are more highly branched, having an average content of side chain methyl substituent groups in excess of about 2. At higher space velocities and lower dimerization temperatures, the degree of branching is reduced but at the expense of significantly lower yields of octene products. This means that significant portions of the product must be refined for recycle to the dimerization reactor which diminishes the economy and efficiency of the process.

SUMMARY OF THE INVENTION

The present invention provides for a catalyst composition which is effective for use in the production of dimer products and higher olefin products from lower olefins such as propylene and butene in high yields and with an average degree of branching in the dimer products of less than about 1.6 methyl groups per molecule, generally in the range of from about 1.0 to 1.4 methyl groups per molecule. The present invention also provides a process for producing such dimer and higher olefin products using the catalyst composition of this invention. The catalyst of the invention comprises an amorphous nickel oxide (NiO) present as a disperse substantial monolayer on the surfaces of a silica ($SiO_2$) support, which support also contains on the surface minor amounts of an oxide of aluminum, gallium or indium such that the ratio of NiO to metal oxide present in the catalyst is within the range of from about 4:1 to about 100:1. The catalyst may be prepared by precipitating a water insoluble nickel salt onto the surfaces of a silica support which has been impregnated with the metal oxide or onto a silica-alumina support which has been dealuminized such that the resulting nickel oxide/alumina ratio will fall within the ranges set forth above. The catalyst may then be activated by calcination in the presence of oxygen at a temperature within the range of from about 500° to 700° C.

DETAILED DESCRIPTION OF THE INVENTION

In order to achieve improved yields of dimer olefins having an average degree of branching of less than about 1.6 in accordance with the present invention, it is essential that the silica-based catalyst contain NiO in the form of an amorphous layer dispersed uniformly on the surface of the silica in quantities such that a substantial monolayer is formed. The presence of the nickel compound as a monolayer maximizes the reaction of the nickel with the underlying silica when the catalyst is calcined to form a less reducible layer-like nickel-silicate or hydroxy silicate species. This requires that the NiO precursor be deposited on the surface of the silica carrier by precipitation techniques such that it is uniformly dispersed on the surface of the silica as a continuous layer, in contrast to other deposition techniques such as impregnation or ion exchange where the NiO decomposition product is present in isolated regions of the silica or in the form of bulklike agglomerates. In these latter forms, the NiO precursor more readily reduces to elemental nickel when the catalyst is activated by calcination, which gives rise to a catalyst which is not active or less active as a dimerization catalyst.

The quantity of dispersed NiO required to form a substantial monolayer on the surface of the $SiO_2$ generally ranges from about 0.07 to about 0.12% by weight per square meter per gram ($m^2/g$) of surface area in the support. Calculations show that an ideal NiO monolayer is formed at a quantity of about 1% of dispersed NiO per 11 $m^2/g$ of $SiO_2$ surface.

Silica gels useful as support materials for the purpose of this invention may generally have a surface area within the range of from about 100 to about 450 $m^2/g$, more preferably from about 200 to about 400 $m^2/g$. Thus, the broad range of NiO content is from about 7 to about 55% by weight and the more preferred range is from about 20 to about 40% by weight, depending on the surface area of the particular support utilized in preparing the catalyst. For the most preferred supports having a surface area of about 300 $m^2/g$, the NiO content generally ranges from about 21 to about 35% by weight, with 28% by weight NiO content being most preferred.

The silica gel may be in dry granular form or in the hydrogel form prior to precipitation of the NiO precursor compound on the surfaces thereof. Silica gel may be prepared by mixing a water-soluble silicate such as sodium or potassium silicate with a mineral acid to effect formation of a silica hydrogel which is then water washed to remove soluble ions. The resulting hydrogel may then be partly or totally dried.

The NiO precursor compound is most readily precipitated onto the surface of the silica gel in the form of a water-insoluble salt such as nickel carbonate, nickel phosphate or nickel hydroxide. The water insoluble salt is preferably generated in-situ by forming an aqueous mixture of the silica gel and a water soluble nickel salt such as nickel nitrate, nickel sulfate, nickel carbonylate, nickel halide or the like, and then adding a base to this mixture to form the insoluble salt. The water insoluble nickel salt which is formed is caused to precipitate in finely divided form within the interstices and on the surface of the silica gel. The treated silica gel is then recovered, washed several times and dried.

A second essential component in the catalyst of the invention is an oxide of a trivalent metal selected from the group consisting of aluminum, gallium and indium. Although the NiO or silica catalyst described above is active for olefin dimerization, it is found to deactivate quickly, probably as a consequence of the formation of large oligomers which remain attached to the surface and act as coke precursors. The presence of a small amount of the trivalent metal oxide within the catalyst yields acid sites which tend to retard large oligomer formation and thereby promote catalytic activity.

The tri valent metal oxide may be incorporated into the silica gel by any suitable technique such as a precipitation method described above or by direct impregnation in the form of a water soluble salt. It is preferred to impregnate the silica gel in aqueous solution by the addition of a water soluble metal salt, such as the nitrate, chloride or sulphate, followed by drying and calcination to reduce the metal salt to the oxide form. The resulting silica gel activated with the trivalent oxide is then further treated as described above to incorporate the NiO layer onto the silica-trivalent metal oxide support.

Yet another method for providing the silica-trivalent metal oxide support is to utilize a silica/alumina, silica/gallia or silica/india gel as the starting material. However, the content of the metal oxide (for example, alumina) present in the support of the present invention must be low in comparison with the content of NiO, as hereinafter pointed out, and it may therefore be necessary to dealuminize silica/alumina gel of relatively high alumina content, i.e., above about 5% by weight, to reduce the content of alumina. This may readily be accomplished by techniques known in the art such as by extraction of the aluminum with an organic or inorganic acid such as nitric acid, sulfuric acid, hydrochloric acid, chloroacetic acid, ethylene diamine tetraacetic acid and like materials. Extraction may be accomplished by adding the acid to an aqueous dispersion of the aluminosilicate followed by stirring, decantation and washing with water. The process may be repeated one or more times until the desired alumina content is achieved. The solids are then dried, calcined and further treated as described above to incorporate the NiO layer onto the silica/alumina support.

The content of trivalent metal oxide with respect to the content of NiO present in the silica support is critical in order to achieve the improved results in terms of dimer yield and minimum average methyl branching present in the dimer product. Where the content of trivalent metal oxide is to low, i.e., above a NiO to trivalent metal oxide ratio of about 100 to 1, then the yield of dimer falls off and the catalyst tends to deactivate quickly. Where the content of trivalent metal oxide is too high, i.e., below a NiO to trivalent metal oxide ratio of about 4 to 1, then the yield of dimer also falls off and the average content of methyl branching in the dimer product increases. In the preferred embodiment of the invention, the content of trivalent metal oxide is such that the ratio of NiO to trivalent metal oxide falls within the range of from about 4:1 to 30:1, more preferably from about 5:1 to 20:1, and most preferably from about 8:1 to about 15:1.

Thus, in the most preferred embodiments of the invention, the catalyst contains from about 21 to 35% by weight of NiO and from about 1 to 5% by weight of trivalent metal oxide, more preferably from about 1.5 to 4% by weight trivalent metal oxide, based on the total weight of NiO, trivalent metal oxide and $SiO_2$.

Olefins which may be polymerized using the catalyst of the present invention include propylene and butene. The process and catalyst is particularly effective for the dimerization of butene to form a mixed polymerization product composed mainly of octenes. The butene feed generally comprises a mixture of butene isomers which are predominantly a mixture of n-butene-1, trans-butene-2 and cis-butene-2. For example, a feed referred to as trans-butene is one where the predominant butene component is trans-butene-2.

The polymerization may be carried out in either the liquid or gas phase. Temperature conditions include a temperature of from about 150° C. to about 275° C. and, in the gas phase, a liquid hourly weight feed rate of butene over the catalyst of from about 0.4 to about 1.8 $h^{-1}$, preferably between 0.6 and 0.7 $h^{-1}$. In the liquid phase, pressures to insure substantial liquid phase operation should be maintained. Residence time in the liquid phase may generally range from about 0.1 to 2 hours or more, with residence time (RT in hours) being defined as:

$$\frac{\text{Wt. of Catalyst (g)} \times \text{Reaction time (hr)}}{\text{Wt. of butene}} = RT$$

Where the polymerization reaction is conducted in the liquid phase and the catalyst is mixed with the olefin monomers, it is preferred that the ratio of monomer to catalyst be in the range of from about 2:1 to about 8:1, more preferably from about 4:1 to about 6:1. In cases where the polymerization is conducted under pressure near, at or above the critical temperature of the olefin monomer, it is often desirable to insure that the liquid phase is maintained by carrying out the reaction in the presence of an inert higher boiling hydrocarbon such as a normal paraffin or cycloparaffin.

Butenes suitable for use in the present invention are commercially available from petroleum refinery operations. Such butenes should not contain more than 1.5% of isobutenes, because isobutene tends to form products with a high degree of branching. Preferably the butenes consist substantially entirely of 1-butene, cis-2-butene and/or trans-2-butene. The presence of fully saturated hydrocarbons in the feed is not generally detrimental, but if the proportion rises above about 80 percent by weight the process becomes uneconomic. The presence of olefins containing more than 4 carbon atoms per molecule should likewise be avoided because they reduce the selectivity of the reaction to produce octenes.

The process of the present invention does not require special apparatus and can be operated in any reactor configuration which is capable of promoting intimate contact between the olefin feed and the catalyst. The process can be operated batchwise, semi-batchwise, or continuously.

Besides the desired octene mixture, the process of the present invention produces minor amounts of $C_{5-7}$ and $C_{9-16}$ olefins. Of these, the most important are the dodecenes, which in some cases are produced in a weight proportion as high as half that of the octenes. It is usually economically worthwhile to isolate and separate such by-product olefins.

The following Examples illustrate the invention:

EXAMPLE 1

This example details a two step preparation of a catalyst consisting of a NiO monolayer deposited at a level of about 28% by weight on a support composed of 97.6% by weight $SiO_2$ and 2.4% by weight of $Al_2O_3$, the weight ratio of NiO to $Al_2O_3$ being about 11.7 to 1.

The first step involved preparing the 2.4% $Al_2O_3$ 97.6% $SiO_2$ support. This was prepared by dispersing 100 g 13% $Al_2O_3$—87% $SiO_2$ cojel obtained from Davison (Davison SMR-6672—surface area=300 $m^2/g$) in 2000 cc water. Nitric acid was then added with stirring until the pH reached 2.7. The mixture was then filtered and washed several times with distilled water until the pH reached 5.6. The recovered solid was treated again with nitric acid/water as described above then washed with water until the pH reached 5.6. The recovered solid was dried for 16 hours at 110° C. and then calcined at 500° C. in flowing air for 16 hours.

For the second step, 67.38 g of $Ni(NO_3)_2.6H_2O$ was dissolved in 700 cc of water. The solution was heated to 32° C. and 35 g of the aluminosilicate prepared as above was slowly added. To this slurry a solution of 33.69 g of $(NH_4)_2CO_3$ in 200 cc of $H_2O$ was added dropwise. The slurry was stirred for $\frac{1}{2}$ hour and filtered. The recovered solid was reslurried to its original volume twice with water and filtered. The solid was dried in a muffle furnace at 120° C. for 16 hours with nitrogen flowing at 200 cc/min. The material was then calcined in the muffle furnace for 1 hour at 232° C., 2 hours at 371° C. and 16 hours at 593° C. in air flowing at 200 cc/min.

EXAMPLE 2

This example details an alternative two step procedure for the preparation of a catalyst consisting of a NiO monolayer deposited at a level of about 28% by weight on a support composed of 97.5% by weight of $SiO_2$ and 2.5% by weight of $Al_2O_3$, the weight ratio of NiO to $Al_2O_3$ being about 11.2 to 1.

In the first step, aluminum nitrate monohydrate in 82 cc distilled water was added to 39 g $SiO_2$ (Cab-O-Sil ® HS-5-Surface area=325 $m^2/g$). The impregnated material was dried overnight in air at 120° C. and calcined in air for 16 hours at 500° C.

This support (2.5% $Al_2O_3$ on $SiO_2$) was then used to prepare 28% NiO/2.5% $Al_2O_3$ on $SiO_2$ by the same procedure as set forth in the second step in Example 1.

EXAMPLE 3

This example details a two step procedure for preparing a catalyst consisting of an NiO monolayer deposited at a level of about 28% by weight on a support composed of 98% by weight of $SiO_2$ and 2% by weight of $Ga_2O_3$(gallia), the weight ratio of NiO to $Ga_2O_3$ being about 14 to 1.

In the first step, 3.14 g of gallium nitrate hexahydrate in 82 cc of distilled water were added to 39.2 g of $SiO_2$ (Carb-O-Sil ® HS-5). The impregnated material was dried overnight in air at 120° C. and calcined in air at 500° C. for 16 hours.

This support (2% $Ga_2O_3$ on $SiO_2$) was then in a second step added to 37.8 g of nickel nitrate hexahydrate in 378 cc of distilled water and precipitated with 18.9 g of $(NH_4)_2CO_3$ in 114 cc of water by following the preparation procedure of the second step of Example 1.

Each of the catalysts produced in Examples 1, 2 and 3 above were evaluated as dimerization catalysts by the following procedure:

EXAMPLE 4

The calcined catalyst (14.13 g) and 7.22 g of decane were charged into a 300 cc stirred autoclave. The autoclave was purged with nitrogen gas, charged with 70.64 g of transbutene-2 and heated under autogeneous pressure at 175° C. for 5 hours. During the 5 hours, intermediate samples were collected to obtain additional data at lower residence times. The residence times (RT) are defined as:

$$RT = \frac{\text{Wt. of catalyst (g)} \times \text{Reaction time (hr)}}{\text{Wt. of butene (g)}} = Hrs$$

At the end of the run, the autoclave was cooled to 5° C. and the resulting liquid product and intermediate samples were analyzed by gas chromatography to measure conversion, selectivity to various products and branchiness of the octene fraction.

Results are reported in Table 1.

As is evident from the data present in Table 1, the catalysts of the present invention provide an average conversion of butene into higher products in the range of from about 80 to about 87% and weight selectivity towards the production of octenes in the range of from about 50 to 62.5%. At the same time, the octenes produced were found to have a low average content of methyl branching in the range of from 1.18 to 1.30 methyl branches per mol of octene produced.

COMPARATIVE EXAMPLE 5

This example illustrates that NiO monolayer catalysts containing a content of alumina outside the range set forth herein and generally as described in U.S. Pat. No. 2,581,228 provide diminished selectivity towards the production of octene and a higher average content of branched octene products.

The catalyst employed in this example was prepared by precipitating a 28% by weight monolayer of NiO on a catalyst support consisting of 25% by weight alumina on 75% by weight of $SiO_2$, having a surface area of about 300 $^2$/g. The NiO monolayer was produced according to the general procedure set forth in the second step of Example 1. The resulting catalyst had a $Ni-O/Al_2O_3$ ratio of 1.1 to 1.

The calcined catalyst was used to polymerize transbutene-2 in accordance with the procedure of Example 4. Polymerization results are also reported in Table 1.

inactive during the polymerization process. This is demonstrated by the following example.

COMPARATIVE EXAMPLE 6

67.38 g of $Ni(NO_3)_2.6H_2O$ was dissolved in 700 cc water. The solution was heated to 32° C. and 35 g Cab-O-Sil $SiO_2$ was slowly added. To this slurry a solution of 33.69 g $(NH_4)_2CO_3$ in 200 cc $H_2O$ was added dropwise. The slurry was stirred for ½ hour and filtered. The recovered solid was reslurried to its original volume twice with water and filtered. The solid was dried in a muffle furnace at 120° C. for 16 hours with nitrogen flowing at 200 cc/min. The catalyst was calcined in a muffle furnace 1 hour at 232° C., 2 hours at 371° C., and 16 hours at 593° C. in air flowing at 200 cc/min.

The catalyst consisted of a 28% by weight monolayer of NiO on $SiO_2$ having a surface area of 300 m$^2$/g.

The calcined catalyst was used to polymerize transbutene-2 in accordance with the procedure of Example 4. Polymerization results are reported in Table 2.

The catalyst remaining at the end of this first cycle was reevaluated for polymerization activity by the following procedure:

Subsequent to the testing described in Example 4 (designated Cycle 1) the autoclave was cooled and the liquid product was removed by suction. The vessel containing the catalyst was purged for 16 hours with $N_2$. 70.6 g of fresh butene and 7.22 g. of n-decane were added to the autoclave followed by heating to the required temperature. The rest of the procedure is the same as described in Example 4. This testing step is

TABLE 1

| CATALYST | RESIDENCE TIME (HR.) | % CONV. | WT. % SELECTIVITY TO | | | | | CRACKING | $C_8$ BRANCHINESS CH3/MOL |
|---|---|---|---|---|---|---|---|---|---|
| | | | $C_8$ | $C_{12}$ | $C_{16}$ | $C_{20}$ | $C_{24}$ | | |
| EXAMPLE 1 | 0.2 | 78 | 58.1 | 24.0 | 10.1 | 4.7 | 0.1 | 3.0 | — |
| | 0.4 | 80 | 57.4 | 24.1 | 10.3 | 4.9 | 0.2 | 3.1 | — |
| | 0.75 | 81 | 54.3 | 25.2 | 11.6 | 5.5 | 0.1 | 3.3 | — |
| | 1.00 | 82 | 52.3 | 25.8 | 12.2 | 5.9 | 0.1 | 3.7 | 1.28 |
| EXAMPLE 2 | 0.2 | 83 | 58.4 | 23.8 | 9.2 | 5.0 | 0.4 | 3.2 | — |
| | 0.4 | 84 | 58.4 | 24.2 | 9.3 | 4.8 | 0.4 | 3.0 | — |
| | 0.75 | 86 | 55.6 | 25.3 | 10.2 | 5.5 | 0.4 | 3.0 | — |
| | 1.00 | 86 | 53.2 | 25.9 | 10.9 | 5.9 | 0.4 | 3.7 | 1.30 |
| EXAMPLE 3 | 0.2 | 78 | 62.5 | 23.5 | 8.2 | 4.1 | 0.3 | 1.4 | — |
| | 0.4 | 84 | 55.6 | 26.0 | 10.7 | 5.6 | 0.5 | 1.7 | — |
| | 0.75 | 88 | 53.3 | 26.7 | 11.7 | 6.6 | 0.5 | 1.3 | — |
| | 1.00 | 88 | 50.6 | 27.2 | 12.6 | 7.4 | 0.6 | 1.7 | 1.18 |
| COMPARATIVE EXAMPLE 5 | 0.2 | 73 | 49.4 | 25.3 | 10.1 | 4.3 | 0.1 | 10.9 | — |
| | 0.4 | 78 | 48.2 | 25.3 | 10.4 | 4.6 | 0.1 | 11.4 | — |
| | 0.75 | 81 | 44.9 | 26.3 | 11.5 | 5.1 | 0.1 | 12.1 | — |
| | 1.00 | 85 | 42.9 | 26.6 | 12.3 | 5.7 | 0.2 | 12.4 | 1.81 |

As is evident from Table 1, the catalyst of comparative Example 5 gave rise to conversions only slightly below the catalysts of the invention, but lower selectivity towards octene production and a much higher degree of branching. In addition, higher quantities of lower cracked products were produced.

As indicated above, catalysts which consist of a monolayer of NiO dispersed on the surface of essentially pure $SiO_2$ also exhibit good activity for the dimerization of butene with good conversion rates, good yield of octene and a low degree of branching in the octene product, but the catalyst is found to quickly become designated Cycle 2. Subsequent testing of catalyst from Cycle 2 as also carried out by the same procedure, and is designated as Cycle 3.

The average percent conversion of the starting butene feed product over residence times of 0.2, 0.4, 0.75 and 1.00 hours in cycle 2 and cycle 3 was determined for the catalysts prepared in accordance with Examples 1-3 and compared with the average percent conversion over the same residence times for the catalyst prepared in accordance with this Example in cycle 2 and cycle 3.

TABLE 2

| CATALYST | RESIDENCE TIME (HR.) | % CONV. | WT. % SELECTIVITY TO | | | | | CRACKING | $C_8$ BRANCHINESS CH3/MOL |
|---|---|---|---|---|---|---|---|---|---|
| | | | $C_8$ | $C_{12}$ | $C_{16}$ | $C_{20}$ | $C_{24}$ | | |
| COMPARATIVE EXAMPLE 6 | 0.2 | 70 | 65.9 | 21.3 | 6.7 | 4.3 | 0.2 | 1.6 | — |
| | 0.4 | 74 | 63.2 | 22.5 | 7.4 | 4.6 | 0.2 | 1.8 | — |
| | 0.75 | 78 | 62.2 | 23.4 | 7.9 | 4.9 | 0.2 | 1.3 | — |
| | 1.00 | 79 | 61.1 | 23.8 | 8.3 | 5.1 | 0.3 | 1.3 | 1.08 |

TABLE 2-continued

| CATALYST | RESIDENCE TIME (HR.) | % CONV. | WT. % SELECTIVITY TO | | | | | CRACKING | C8 BRANCHINESS CH3/MOL |
|---|---|---|---|---|---|---|---|---|---|
| | | | $C_8$ | $C_{12}$ | $C_{16}$ | $C_{20}$ | $C_{24}$ | | |
| CYCLE 2 | (AVERAGE) | 41 | | | | | | | |
| CYCLE 3 | (AVERAGE) | 20 | | | | | | | |
| EXAMPLE 1 | | | | | | | | | |
| CYCLE 2 | (AVERAGE) | 64 | | | | | | | |
| CYCLE 3 | (AVERAGE) | 68 | | | | | | | |
| EXAMPLE 2 | | | | | | | | | |
| CYCLE 2 | (AVERAGE) | 66.5 | | | | | | | |
| CYCLE 3 | (AVERAGE) | 58.7 | | | | | | | |
| EXAMPLE 3 | | | | | | | | | |
| CYCLE 2 | (AVERAGE) | 60.3 | | | | | | | |
| CYCLE 3 | (AVERAGE) | 66.8 | | | | | | | |

Results are also shown in Table 2.

As is evident from the data in Table 2, good conversion, yield of octene and low branchiness of the octene produced is generally obtained in the first cycle with the NiO on $SiO_2$ catalyst, but the conversion of the feedstock over the average residence time is found to markedly drop off in the second and third cycles. This is in sharp contrast to the % conversion of the feedstock over the average residence time achieved in cycles 2 and 3 using the catalysts prepared in accordance with Examples 1, 2 and 3.

The following comparative example illustrates that the use of the precipitation technique for depositing the NiO precursor material on the support surface is critical to achieve suitable catalytic activity.

COMPARATIVE EXAMPLE 7

A 28% by weight NiO on $SiO_2$ catalyst was prepared by impregnating the catalyst with a water soluble nickel salt.

A nickel nitrate solution consisting of 67.38 g nickel nitrate hexahydrate in a volume of water to make 750 cc was added to 35 g Cab-O-Sil $SiO_2$. The catalyst was dried at 120° C. in a muffle furnace with air flowing at 200 cc min. After drying, the impregnated material was calcined at 500° C. in a muffle furnace for 16 hours with air flowing at 200 cc/min.

The catalyst was found by microscopic examination to contain discrete crystallites or agglomerates predominantly of NiO present as a discontinuous phase in regions of the support surface.

The calcined catalyst was used to attempt to polymerize transbutene-2 in accordance with the procedure of Example 4. None of the starting feed material was found to have been converted in contrast with the good results achieved in Cycle 1 in Comparative Example 6.

What we claim is:

1. A catalyst comprising NiO present as a continuous, disperse substantial monolayer on the surfaces of a silica support having a surface area within the range of about 100 to 450 $m^2/g$, said support further containing an oxide of a trivalent metal selected from the group consisting of aluminum, gallium and indium, the quantity of said NiO present on said support being in the range of from about 0.07 to 0.12% by weight per square meter of support surface area, and the weight ratio of NiO to trivalent metal oxide present in said support being at least about 4 to 1.

2. The catalyst of claim 1 wherein the weight ratio of said NiO to said trivalent metal oxide is within the range of 4:1 to 100:1.

3. The catalyst of claim 2 wherein the weight ratio of said NiO to said trivalent metal oxide is up to 30 to 1.

4. The catalyst of claim 3 wherein the weight ratio of said NiO to said trivalent metal oxide is at least about 8 to 1.

5. The catalyst of claim containing from about 21 to about 35% by weight of said NiO and from about 1 to about 5% by weight of said trivalent metal oxide.

6. The catalyst of claim 1 wherein said support has a surface area within the range of from about 200 to 400 $m^2/g$.

7. The catalyst of claim 6 wherein said trivalent metal oxide is aluminum oxide.

8. The catalyst of claim 6 wherein said trivalent metal oxide is gallium oxide.

9. A process for preparing the catalyst of claim 1 comprising:
(a) providing a silica support having a surface area within the range of about 100 to 450 $m^2/g$;
(b) impregnating said support with a water or organic solvent soluble precursor compound containing cations selected from the group consisting of aluminum, gallium and indium;
(c) calcining said impregnated support to convert said precursor compound to the oxide form;
(d) precipitating on the surfaces of the support obtained from step (c) a water insoluble precursor compound containing nickel; and
(e) calcining the product of step (d) to convert said water insoluble precursor compound into NiO.

10. A process for preparing the catalyst of claim 1 comprising:
(a) providing a support containing silica and an oxide of a trivalent metal selected from the group consisting of aluminum, gallium and indium, said support having a surface area within the range of about 100 to 450 $m^2/g$;
(b) precipitating on the surfaces of said support a water insoluble precursor compound containing nickel; and
calcining the product of step (b) to convert said water insoluble precursor compound into NiO.

11. The process of claim 9 wherein the weight ratio of said NiO to said trivalent metal oxide is at least about 5 to 1 and up to about 30 to 1.

12. The process of claim 10 wherein the weight ratio of said NiO to said trivalent metal oxide is at least about 5 to 1 and up to about 30 to 1.

13. The process of claim 10 wherein said NiO is present on said support in the range of from 0.07 to 0.12% by weight per square meter of support surface area.

14. The process of claim 13 wherein said catalyst contains from about 21 to about 35% by weight of said NiO.

15. The process of claim 14 wherein said catalyst contains from about 1 to about 5% by weight of said trivalent metal oxide.

* * * * *